United States Patent
Chiba et al.

(10) Patent No.: US 9,459,591 B2
(45) Date of Patent: Oct. 4, 2016

(54) MULTIPOINT SIMULTANEOUS MEASUREMENT METHOD AND MULTIPOINT SIMULTANEOUS MEASUREMENT SYSTEM IN ELECTRIC POWER STATION, AND INTERNAL CLOCK USED THEREFOR

(75) Inventors: Tatsuya Chiba, Sendai (JP); Masaki Sato, Ishinamaki (JP); Yoichi Yanagisawa, Sendai (JP)

(73) Assignees: CVENGINEERING CORPORATION, Miyagi (JP); TOHOKU ELECTRIC POWER CO., INC., Miyagi (JP)

( * ) Notice: Subject to any disclaimer, the term of this patent is extended or adjusted under 35 U.S.C. 154(b) by 741 days.

(21) Appl. No.: 13/981,805

(22) PCT Filed: May 28, 2012

(86) PCT No.: PCT/JP2012/063605
§ 371 (c)(1),
(2), (4) Date: Jul. 25, 2013

(87) PCT Pub. No.: WO2012/176583
PCT Pub. Date: Dec. 27, 2012

(65) Prior Publication Data
US 2013/0311135 A1 Nov. 21, 2013

(30) Foreign Application Priority Data

Jun. 22, 2011 (JP) ................................. 2011-138002
Dec. 6, 2011 (JP) ................................. 2011-267215

(51) Int. Cl.
*G04G 5/00* (2013.01)
*G04R 20/02* (2013.01)
*G04R 40/06* (2013.01)
*G04R 20/28* (2013.01)
*G04R 20/30* (2013.01)
*H04Q 9/04* (2006.01)

(52) U.S. Cl.
CPC ................. *G04G 5/00* (2013.01); *G04R 20/02* (2013.01); *G04R 20/28* (2013.01); *G04R 20/30* (2013.01); *G04R 40/06* (2013.01); *H04Q 9/04* (2013.01); *H04Q 2209/753* (2013.01)

(58) Field of Classification Search
CPC ...... G04R 20/02; G04R 40/06; G04R 20/28; G04R 20/30; G04G 5/00; H04Q 2209/753; H04Q 9/04; G05B 15/02; G05B 17/02; G05B 2219/37526; G05B 23/024; G01R 23/02; G01R 29/02; G01R 31/31922
USPC ........................................ 702/127, 176, 178
See application file for complete search history.

(56) References Cited

U.S. PATENT DOCUMENTS

| | | | |
|---|---|---|---|
| 6,577,245 B2 * | 6/2003 | Hammond | G01D 4/002 340/870.02 |
| 2015/0051750 A1 * | 2/2015 | Kurs | G05F 1/625 700/298 |

FOREIGN PATENT DOCUMENTS

| | | |
|---|---|---|
| JP | B2-07-120973 | 12/1995 |
| JP | B2-2553689 | 11/1996 |

(Continued)

OTHER PUBLICATIONS

Jul. 31, 2012 International Search Report issued in International Application No. PCT/JP2012/063605.

*Primary Examiner* — An Do
(74) *Attorney, Agent, or Firm* — Oliff PLC

(57) ABSTRACT

A multipoint simultaneous measurement method and a multipoint simultaneous measurement system in an electric power station and an internal clock used therefor, capable of performing measurement at the correct time even at a place in the electric power station where GPS radio waves cannot be received, and of securing simultaneity with high accuracy and with ease without connecting a plurality of measurement points via a cable and the like.

7 Claims, 11 Drawing Sheets

(56) References Cited

FOREIGN PATENT DOCUMENTS

| | | |
|---|---|---|
| JP | A-2000-078711 | 3/2000 |
| JP | A-2003-207586 | 7/2003 |
| JP | A-2005-140595 | 6/2005 |
| JP | A-2006-047101 | 2/2006 |
| JP | A-2007-206848 | 8/2007 |
| JP | A-2008-209995 | 9/2008 |
| JP | A-2009-043244 | 2/2009 |
| JP | A-2009-180511 | 8/2009 |

* cited by examiner

Fig.7
(a)
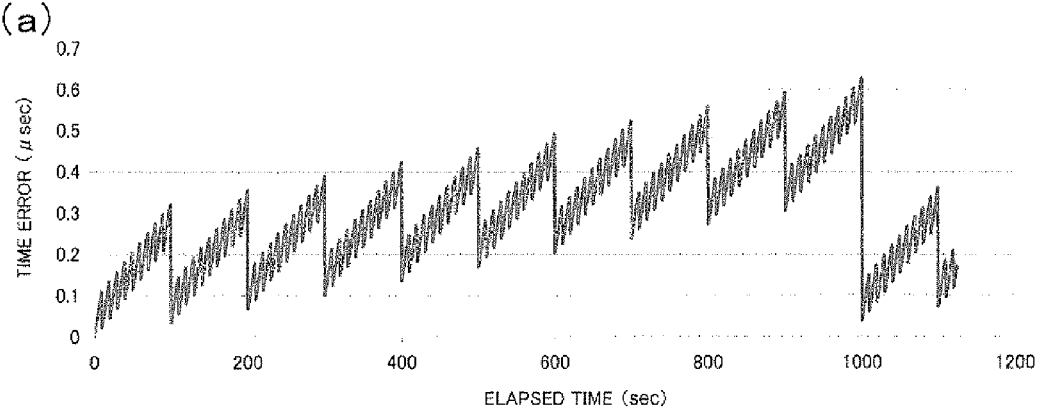
(b)
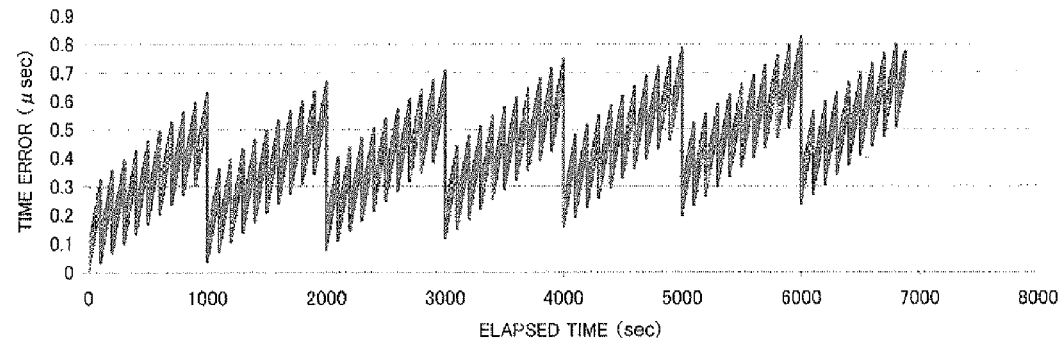

Fig.8

| | STEP | MASTER UNIT | MEASURING DEVICES |
|---|---|---|---|
| PREPARATION | 1 | TURN ON | TURN ON AND START HEAT RUN (FIRST TIME ONLY) |
| | 2 | TURN ON WIRELESS LAN ACCESS POINT | |
| | 3 | CONFIRM CONNECTION | FINISH HEAT RUN (20 TO 30 MINUTES) |
| | 4 | | SYNCHRONIZE TIME BY GPS (FIRST TIME ONLY) |
| | 5 | | CONFIRM WIRELESS CONNECTION |
| MEASUREMENT | 6 | | CONNECT VOLTAGE AND CURRENT SIGNALS |
| | 7 | PRESS MEASUREMENT BUTTON | |
| | 8 | SET AND DISPLAY MEASUREMENT TIME | |
| | 9 | TRANSMIT MEASUREMENT TIME | RECEIVE AND DISPLAY MEASUREMENT TIME |
| | 10 | | CONFIRM AND SET RANGE |
| | 11 | | PERFORM SAMPLING AT MEASUREMENT TIME |
| | 12 | RECEIVE MEASUREMENT DATA | TRANSMIT MEASUREMENT DATA |
| | 13 | DISPLAY MEASUREMENT DATA | |
| | 14 | CHECK AND STORE MEASUREMENT DATA | |
| FINISH | 15 | PERFORM NEXT MEASUREMENT OR TURN OFF | MOVE TO NEXT MEASUREMENT POINT OR TURN OFF |

| | |
|---|---|
| | ITEMS TO BE OPERATED MANUALLY |

Fig.11
(a)
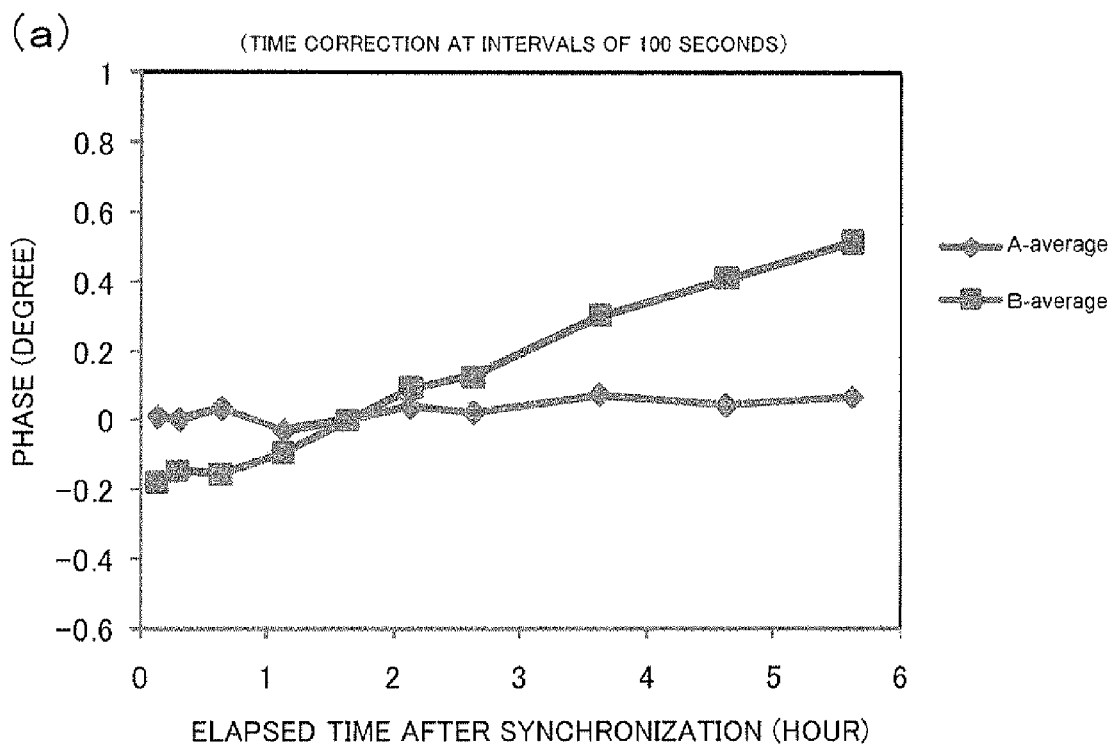
(b)
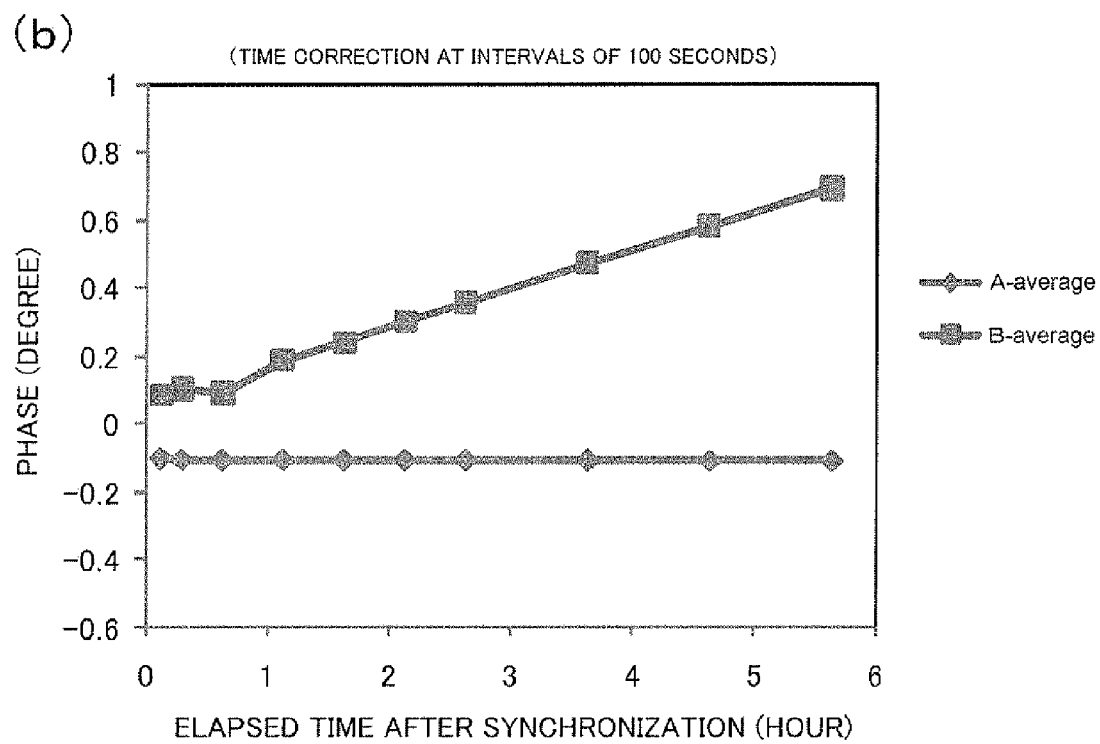

MULTIPOINT SIMULTANEOUS MEASUREMENT METHOD AND MULTIPOINT SIMULTANEOUS MEASUREMENT SYSTEM IN ELECTRIC POWER STATION, AND INTERNAL CLOCK USED THEREFOR

TECHNICAL FIELD

The present invention relates to a multipoint simultaneous measurement method and a multipoint simultaneous measurement system in an electric power station, and an internal clock used therefor.

BACKGROUND ART

Conventionally, a time deviation is caused with the lapse of time in a clock that contains an oscillator such as a quartz resonator, unless correction of some kind is applied thereto (refer to Japanese Unexamined Patent Application Publication No. 2009-180511, for example). When it is necessary to perform measurement or the like at the correct time in a more precise manner, the measurement or the like is performed while receiving highly accurate time information by GPS radio waves. Further, when it is necessary to perform the measurement simultaneously at a plurality of measurement points, securing simultaneity in the measurement becomes important (refer to Japanese Patent No. 2553689, Japanese Examined Patent Application Publication No. H07-120973, and Japanese Unexamined Patent Application Publication No. 2007-206848, for example), and the simultaneity is secured by connecting a plurality of measuring devices via a cable and the like.

When a switchboard is repaired or remodeled in a power station and a substation, for example, a voltage current transformer (VCT) is used to perform a VCT combination test and a voltage matching test (refer to Japanese Unexamined Patent Application Publication No. 2000-78711, for example). As it is necessary for these tests to obtain a phase difference in voltage and current between the measurement point on a reference side and the measurement point on a comparison side, the voltage and the current are measured at the measurement point on the reference side and the measurement point on the comparison side simultaneously. At this time, the simultaneity in the measurement is secured by connecting the measuring device on the reference side and the measuring device on the comparison side via the cable and the like. Although it is possible to allow the plurality of measuring devices to communicate with each other wirelessly via an FM communication system, it is difficult to secure the simultaneity as a time lag is caused at the time of modulating/demodulating radio signals.

SUMMARY OF INVENTION

Technical Problem

However, according to the method of performing the measurement while receiving the GPS radio waves, there is a problem in that the highly accurate time information cannot be received in an indoor environment and the like in the electric power station where the GPS radio waves cannot be received. According to the method of performing the measurement by connecting the plurality of measuring devices via the cable and the like, the simultaneity can be secured easily and effectively when the measuring devices are arranged close to each other. However, when the measurement points are at separate places, there is a problem in that routing of the cable and the like requires time and effort.

The present invention is made in view of these problems, and it is an object of the present invention to provide a multipoint simultaneous measurement method and a multipoint simultaneous measurement system in an electric power station and an internal clock used therefor, capable of measuring the current and the voltage at the correct time even at the plurality of points in the electric power station where the GPS radio waves cannot be received, and of securing the simultaneity with high accuracy and with ease without connecting the plurality of measuring devices via the cable and the like.

Solution to Problem

In order to achieve the above-described object, a multipoint simultaneous measurement method according to the present invention includes the steps of providing a plurality of measuring devices and a master unit configured to be able to wirelessly transmit/receive a signal to/from the measuring devices, providing an internal clock that is operated by time correcting means having an oscillator contained therein and a counter for counting an output pulse from the oscillator in each of the measuring devices, the internal clock being configured to correct its time by adding difference between a pulse number that is obtained by multiplying an actual oscillating frequency oscillated by the oscillator by a fixed period of time and a product that is obtained by multiplying a target oscillating frequency by fixed period of time, to the pulse number at intervals of the fixed period of time, the fixed period of time being a time when the pulse number after a decimal point if the oscillating frequency of the oscillator is rounded to be an integer, synchronizing the internal clocks of the measuring devices by GPS radio waves or by connecting the measuring devices, correcting the internal clocks continuously by the measuring devices at intervals of the fixed period of time from when the internal clocks are synchronized until when measurement is finished, arranging the measuring devices to respective measurement points, transmitting a measurement time from the master unit to the measuring devices, and measuring a predetermined physical quantity by the measuring devices when the internal clocks reach the measurement time transmitted from the master unit, and transmitting measurement data from the measuring devices to the master unit. It is particularly preferable that the fixed period of time is 100 seconds to 300 seconds.

The internal clock according to the present invention is used for the multipoint simultaneous measurement method according to the present invention. According to the internal clock of the present invention, the fixed period of time may include a plurality of correction times that are different from each other.

A multipoint simultaneous measurement system is an electric power station according to the present invention, comprising a plurality of measuring devices each having the internal clock according to the present invention, to measure a predetermined physical quantity when the internal clock reaches a specified time, and a master unit configured to be able to wirelessly transmit/receive a signal to/from the measuring devices, wherein the master unit is configured to be able to transmit a measurement time to the measuring devices and to receive the predetermined physical quantity measured by the measuring devices from the measuring devices, and wherein each of the measuring devices is configured to measure the predetermined physical quantity when the internal clock reaches the measurement time transmitted from the master unit, and to transmit it to the master unit.

Advantageous Effects of Invention

According to the present invention, it is possible to provide a multipoint simultaneous measurement method and a multipoint simultaneous measurement system and an internal clock used therefor, capable of performing the measurement at the correct time even at the place where the GPS radio waves cannot be received, and of securing the simultaneity with high accuracy and with ease without connecting the plurality of measuring points via the cable and the like.

BRIEF DESCRIPTION OF DRAWINGS

FIG. 7 is a graph showing changes in a time error relative to an elapsed time in three stage correction shown in FIG. 6;

FIG. 8 is a table showing measuring procedures of a multipoint simultaneous measurement method according to the embodiment of the present invention;

FIG. 11($a$) is a graph showing the average of the phases for each measuring device with regard to the changes in the current phases shown in FIG. 10($a$), and FIG. 11($b$) is a graph showing the average of the phases for each measuring device with regard to the changes in the voltage phases shown in FIG. 10($b$);

DESCRIPTION OF EMBODIMENTS

Figure 1:
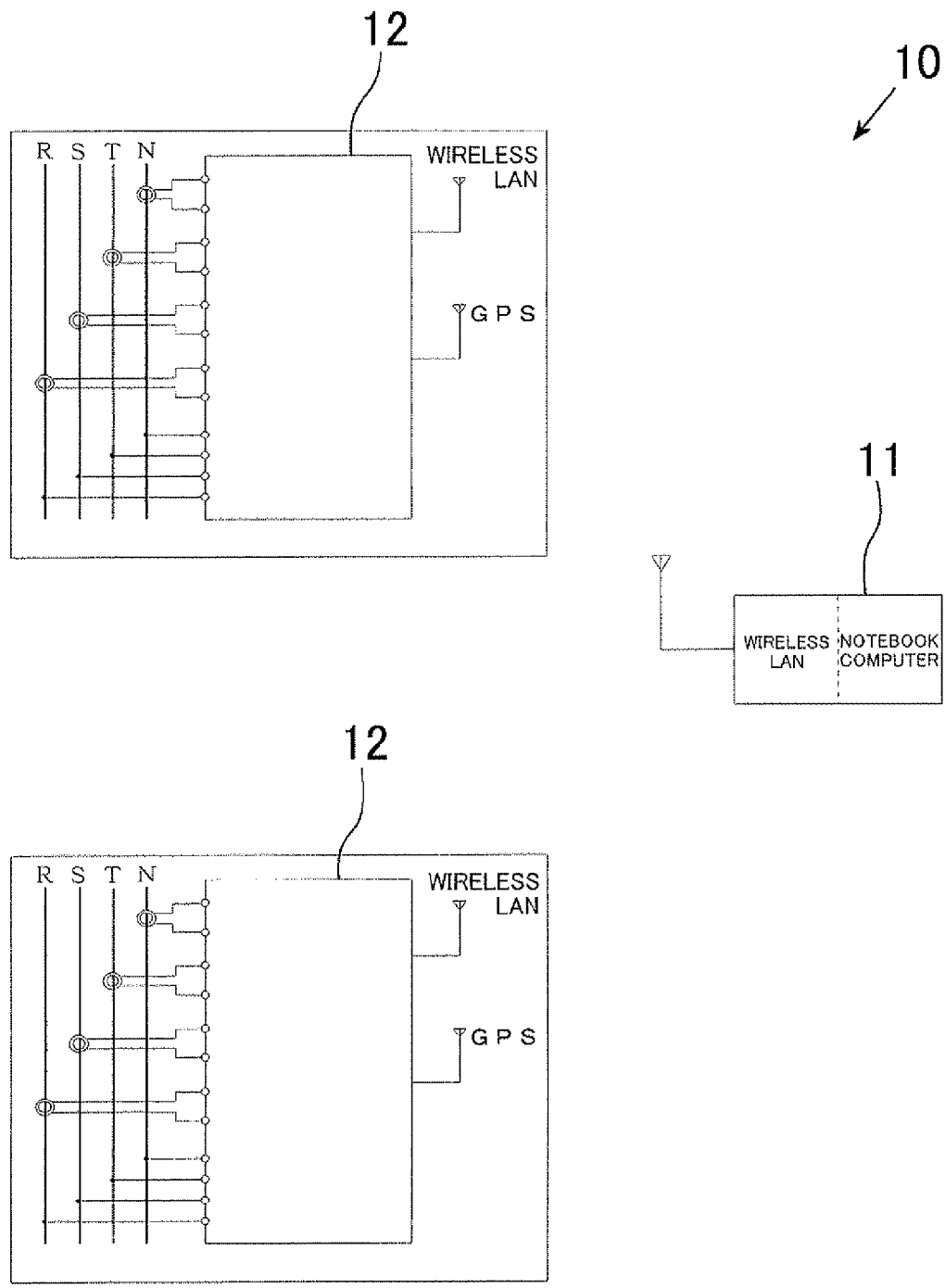
FIG. 1 is a block diagram showing a multipoint simultaneous measurement system according to an embodiment of the present invention.

A general clock that is operated by an oscillator contained therein is able to substantially prevent a deviation from the correct time during a short period of time, such as one second, by using a highly accurate oscillator. Even when an adjustment of the oscillator is made properly, however, a slight deviation is caused between an actual oscillating frequency and a target oscillating frequency of the oscillator. An internal clock according to the present invention corrects a time based on a difference between the actual oscillating frequency and the target oscillating frequency of the oscillator, so as to eliminate the deviation and to obtain highly accurate time information. Further, as the time is corrected at intervals of a fixed period of time, it is possible to keep the time information with high accuracy. Even though the deviation between the actual oscillating frequency and the target oscillating frequency of the oscillator is slight during the short period of time such as one second, the deviation increases for a relatively long period of time (about 100 seconds, for example). The correction is facilitated when the time is corrected at intervals of the relatively long period of time (about 100 seconds, for example). It is preferable that the internal clock according to the present invention in particular is configured to correct the time by adding a difference between a pulse number of the oscillator that is actually counted during a fixed period of time and a product that is obtained by multiplying the target oscillating frequency by the fixed period of time, to the product at intervals of the fixed period of time.

When the internal clock according to the present invention is contained in a measuring device for use, measurement can be performed at the correct time even in an indoor environment and the like where GPS radio waves cannot be received. After the time is set at a place where the GPS radio waves can be received, the measuring device is moved to a place where the GPS radio wave cannot be received, so that it is possible to keep the time information with higher accuracy. When the measurement is made simultaneously at a plurality of measurement points, the internal clock according to the present invention is contained in each of the measuring devices, so as to secure simultaneity with high accuracy and with ease without connecting a cable and the like.

According to the internal clock of the present invention, the correction is made at intervals of each of a plurality of correction times that are different from each other, so as to keep the time information with higher accuracy. When the correction is made at intervals of the longest correction time, a time error increases during a period from when a predetermined period has elapsed after the correction is made and before the next correction time. By making the correction minutely at intervals of the shorter correction time during the period, it is possible to reduce the time error. It is preferable to determine the longest correction time according to required time accuracy. As the number of the correction times increases, the time information can be kept with higher accuracy, but at the same time, a circuit for correction becomes more complex. Therefore, it is preferable to determine the number of the correction times according to the required time accuracy. When each of the correction times is set to be (1/integer) times as short as the longest correction time, the circuit for correction can be set with ease. With regard to the correction times, for example, the longest correction time may be 1,000 seconds, the second longest correction time may be 100 seconds, and the shortest correction time may be 10 seconds.

A multipoint simultaneous measurement method and a multipoint simultaneous measurement system according to the present invention are preferably used when it is necessary to measure a physical quantity at a plurality of measurement points simultaneously, such as a VCT combination test and a voltage matching test. According to the multipoint simultaneous measurement method of the present invention, the internal clocks according to the present invention, contained in the respective measuring devices, are subjected to continuous correction at intervals of the fixed period of time, during a period from when the internal clocks are synchronized by the GPS radio waves or by connecting the respective measuring devices until when the measurement is finished, so that the time information of the internal clocks can be kept precisely. Further, according to the multipoint simultaneous measurement system of the present invention, each of the measuring devices contains the internal clock according to the present invention, so that the internal clock in each of the measuring devices can be kept with high accuracy.

According to the multipoint simultaneous measurement method and the multipoint simultaneous measurement system of the present invention, the predetermined physical quantity is measured by measuring means of each of the measuring devices when the internal clock that is kept with high accuracy reaches the specified time. This makes it possible to secure the simultaneity with high accuracy when the measurement is made simultaneously by the measuring devices at the plurality of points. As the measurement is performed by the measuring devices based on the time of the internal clocks, without connecting the measuring devices via the cable and the like, the measurement can be performed easily even when the measurement points are at separate places. Thus, according to the multipoint simultaneous measurement method and the multipoint simultaneous measurement system of the present invention, it is possible to secure the simultaneity with high accuracy and with ease even when the cable and the like are not connected.

According to the multipoint simultaneous measurement method and the multipoint simultaneous measurement system of the present invention, a measurement time can be controlled by the master unit. Further, measurement data consisting of the predetermined physical quantities measured by the respective measuring devices is transmitted to the master unit, so as to control the data intensively by the master unit. The master unit is formed by a computer such as a notebook computer, stores the measurement data transmitted from the respective measuring devices, and may perform various data analyses. Any communication method may be employed for transmission/reception between the master unit and the respective measuring devices as long as the communication is performed wirelessly, such as a wireless LAN, a PHS (Personal Handyphone System), a cellular phone and the like.

According to the multipoint simultaneous measurement method and the multipoint simultaneous measurement system of the present invention, the physical quantities measured by the measuring devices may include a three-phase AC voltage, a single-phase AC voltage, a three-phase AC current and a single-phase AC current, or the three-phase AC voltage and the single-phase AC voltage. In this case, the VCT combination test and the voltage matching test can be carried out when the three-phase AC voltage, the single-phase AC voltage, and the three-phase AC current and the single-phase AC current are measured by the respective measuring devices, and the voltage matching test can be carried out when the three-phase AC voltage and the single-phase AC voltage are measured by the respective measuring devices.

Hereinafter, an embodiment of the present invention will be explained with reference to the drawings.

FIG. 1 to FIG. 13 show the multipoint simultaneous measurement method, the multipoint simultaneous measurement system, and the internal clock used therefor, according to the embodiment of the present invention.

As shown in FIG. 1, a multipoint simultaneous measurement system 10 is configured to be usable in the VCT combination test and the voltage matching test carried out in a power station and a substation, and has a master unit 11 and two measuring devices 12.

As shown in FIG. 1, the master unit 11 is formed by a notebook computer, and is configured to be able to transmit/receive signals wirelessly to/from the respective measuring devices 12 by using the wireless LAN or the PHS. The master unit 11 is configured to be able to transmit a measurement time, as the time when the respective measuring devices 12 perform the measurement, to the respective measuring devices 12, and to receive measurement data that is measured by the respective measuring devices 12 from the respective measuring devices 12. Further, the master unit 11 is configured to be able to store the measurement data received from the respective measuring devices 12, display the measurement data, and perform various data analyses such as a phase analysis.

Figure 2:
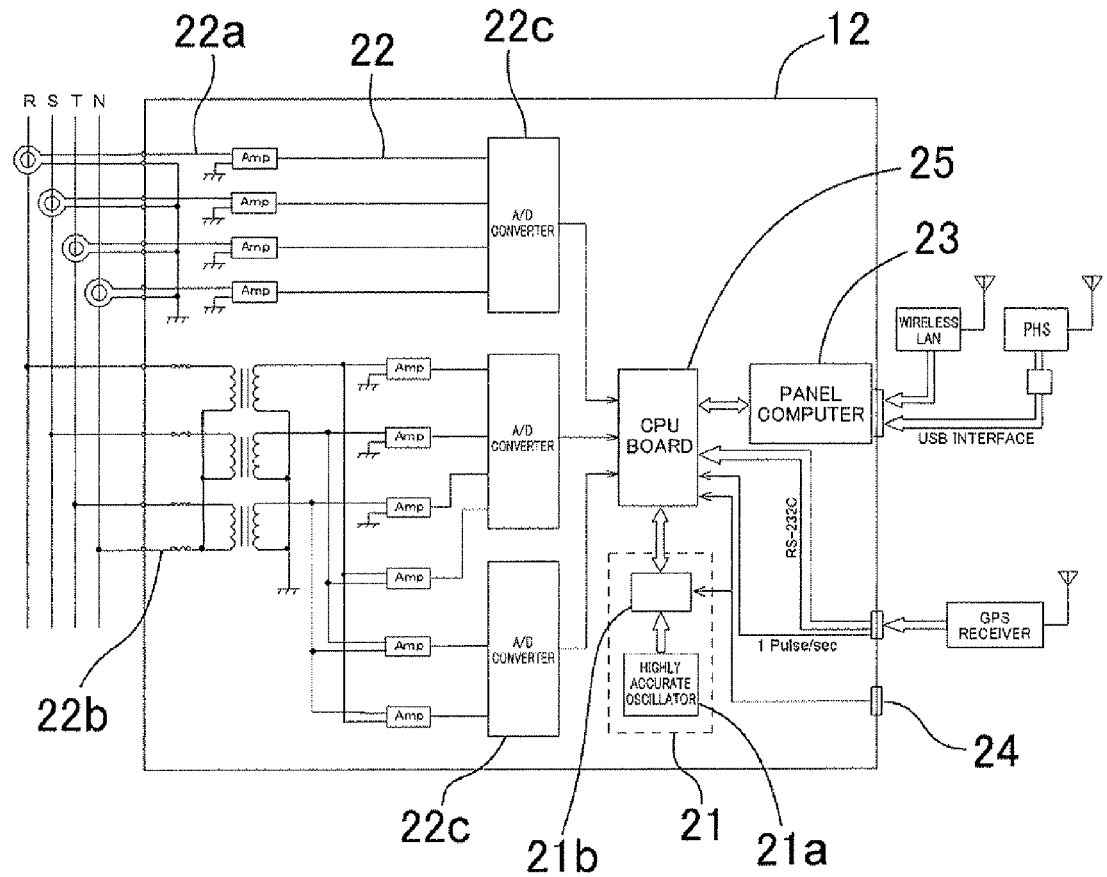
FIG. 2 is a block diagram showing a measuring device of the multipoint simultaneous measurement system shown in FIG. 1.

As shown in FIG. 2, each of the measuring devices 12 has an internal clock 21, measuring means 22, transmitting/receiving means 23, a connector for connection and synchronization 24, and a control unit 25. The internal clock 21 is formed by a clock operated by a highly accurate oscillator 21a that is contained therein, and is connected to the control unit 25. The internal clock 21 contains the oscillator 21a whose oscillating frequency is 10 MHz. Further, the internal clock 21 has time correcting means 21b that corrects the time at intervals of a fixed period of time.

The measuring means 22 has a current measuring unit 22a capable of measuring the three-phase AC current and the single-phase AC current, and a voltage measuring unit 22b capable of measuring the three-phase AC voltage and the single-phase AC voltage. The current measuring unit 22a is configured to measure a first phase (R), a second phase (S), a third phase (T), and a fourth phase (N), and the voltage measuring unit 22b is configured to measure R-N, S-N, T-N, R-S, S-T, and T-R. The current measuring unit 22a and the voltage measuring unit 22b are connected to the control unit 25 via A/D converters 22c.

The transmitting/receiving means 23 is formed by a panel computer and is connected to the control unit 25. The transmitting/receiving means 23 is able to be connected to the wireless LAN and the PHS via a USB interface, and to transmit/receive the signal to/from the master unit 11 by using the connected wireless LAN and the PHS. The connector for connection and synchronization 24, to which a dedicated cable can be connected, is connected to the internal clock 21 and the control unit 25. The measuring devices 12 can be connected to each other by connecting the respective connectors for connection and synchronization 24 to both ends of the dedicated cable.

The control unit 25 is formed by a CPU board, and is able to control the internal clock 21, the measuring means 22, and the transmitting/receiving means 23. The control unit 25 is configured to receive the measurement time from the master unit 11 via the transmitting/receiving means 23, allow the measuring means 22 to measure the current and the voltage when the internal clock 21 reaches the specified measurement time, and transmit the measurement data to the master unit 11 via the transmitting/receiving means 23. Further, the control unit 25 is configured to be able to connect to a GPS receiver via an RS-232C. Similarly, the control unit 25 is configured to be able to input a 1 pulse/second signal that is outputted from the GPS receiver.

[Time Correction Mechanism of Internal Clock]

The time correcting means 21b corrects the time of the internal clock 21 as follows.

It is supposed that an oscillator "OCXO8663 (manufactured by Oscilloquartz SA)" whose oscillating frequency is 10 MHz is employed as the oscillator 21a that is highly accurate and contained in the internal clock 21. Incidentally, frequency stability of the oscillator 21a is $6 \times 10^{-10}$. When the internal clock 21 is corrected by using the GPS, it is necessary to allow the actual oscillating frequency of the oscillator 21a to have a value that is as close to 10 MHz as possible.

Even though the adjustment is made properly, the actual oscillating frequency of the oscillator 21a is slightly deviated from 10 MHz as the target oscillating frequency. When, for example, the actual oscillating frequency of the oscillator 21a is 10,000,000.12 Hz, the time error after the lapse of one hour (3600 seconds) becomes 43.2 μsec, as shown in Table 1. Further, when the actual oscillating frequency is 10,000,000.01 Hz, the time error after the lapse of one hour (3600 seconds) becomes 3.6 μsec. This shows that it is necessary to make the oscillating frequency coincide with the target oscillating frequency to the second decimal place, in order to reduce the error per hour to be 10 μsec or less that is necessary for the highly accurate and simultaneous measurement. When this is performed by a frequency adjustment method using a frequency counter, a 9-digit frequency counter is required. However, the 9-digit frequency counter is not commercially available, and it is not possible to perform the normal frequency adjustment method using the frequency counter.

TABLE 1

| Elapsed time (sec.) | Pulse number | Error (μsec) | Pulse number | Error (μsec) |
| --- | --- | --- | --- | --- |
| 1 | 10,000,000.12 | 0.012 | 10,000,000.01 | 0.001 |
| 10 | 100,000,001.20 | 0.12 | 100,000,000.10 | 0.01 |
| 100 | 1,000,000,012.00 | 1.2 | 1,000,000,001.00 | 0.1 |
| 1000 | 10,000,000,120.00 | 12 | 10,000,000,010.00 | 1 |
| 3600 | 36,000,000,432.00 | 43.2 | 36,000,000,036.00 | 3.6 |
| 10000 | 100,000,001,200.00 | 120 | 100,000,000,100.00 | 10 |

For this reason, the time correcting means 21b is configured to correct the time according to the actual oscillating frequency of the oscillator 21a once in 100 seconds, for example, when the two digits after the decimal point of the oscillating frequency are rounded to be an integer, without employing a method of making the oscillating frequency of the oscillator 21a precisely coincide with the target oscillating frequency. Hereinafter, an explanation will be given to the case where the correction time is 100 seconds. By applying the correction once in 100 seconds, the correction is facilitated because the two digits after the decimal point can be handled as the integer (refer to the pulse number when the elapsed time is 100 seconds in the Table 1).

Figure 3:
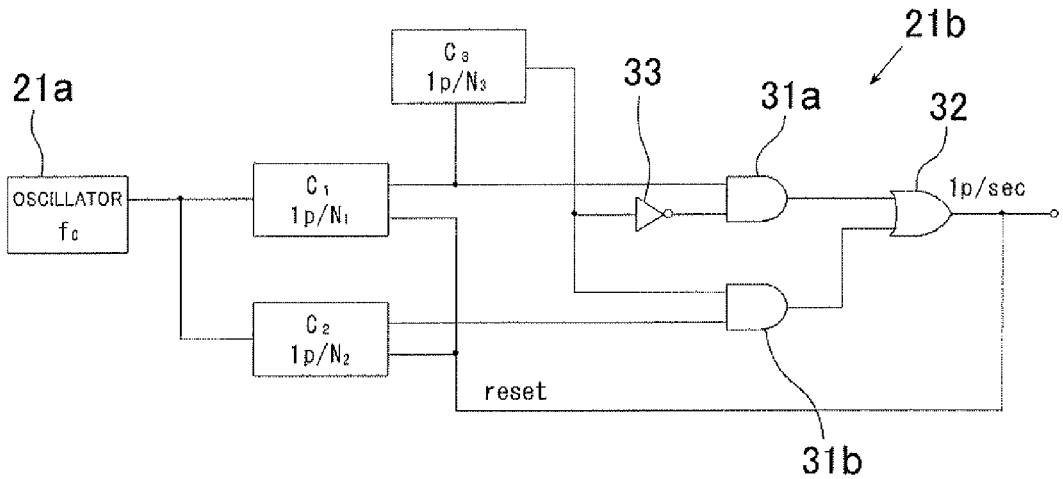
FIG. 3 is a circuit diagram showing time correcting means of the measuring device of the multipoint simultaneous measurement system shown in FIG. 1.

As shown in FIG. 3, the time correcting means 21b is formed by a circuit that counts output pulses from the oscillator 21a and generates one pulse per second (1 p/sec). In FIG. 3, $C_1$, $C_2$, and $C_3$ are pulse counters, $N_1$ is $10^7$ as a pulse number corresponding to the target oscillating frequency (10 MHz), $N_2$ is set as $10^7+12$ when the actual oscillating frequency is 10,000,000.12 Hz, and $N_3$ is 100 as the correction is applied once in 100 seconds. Namely, when the actual oscillating frequency of the oscillator is measured to be 10,000,000.12 Hz (as will be described later), the internal clock gains 12 pulses per 100 seconds (1.2 μsec). Therefore, the correction can be made in such a manner that $10^7$ pulses are made in one second for 99 times out of 100 seconds, and for the remaining one time, $10^7+12$ counts are made in one second, so as to make $10^7 \times 99 + 10^7 + 12 = 10^9 + 12$ counts. In other words, when $10^7+12$ counts are made in one second, it means that the internal clock is set back by 12 pulses (1.2 μsec).

As shown in FIG. 3, an output voltage of $C_3$ becomes "H (high level)" with a high voltage only when a pulse output of $C_1$ is counted for 100 times, and thereafter changes to "L (low level)" with a low voltage. It should be noted that an output of an AND circuit becomes "H" only when both inputs are "H". Therefore, when the output of $C_3$ is "L", an input to the AND circuit 31a becomes "H" by a NOT circuit 33, and an input to an AND circuit 31b becomes "L". Thus, an output of the AND circuit 31a becomes "H", and the output of $C_1$ is inputted to an OR gate circuit 32. Further, when the output of $C_3$ is "H", the input to the AND circuit 31a becomes "L" by the NOT circuit 33, and the input to the AND circuit 31b becomes "H". Thus, an output of the AND circuit 31b becomes "H", and an output of $C_2$ is inputted to the OR gate circuit 32 via the AND circuit 31b. Namely, the pulses are generated by the output of $C_1$ at the first time to the 99th time, and the pulse is generated by the output of $C_2$ only at the 100th time.

Thereby, the time correcting means 21b keeps the time (counts the pulses) according to the oscillating frequency of $N_1=10^7$ from the first to the 99th second, and keeps the time (counts the pulses) according to $N_2=10^7+12$ at the 100th second. Thus, the actual pulse number "$10^9+12$" of the oscillator 21a for 100 seconds is counted. Then, a number of counts "12", as a difference between the actually-counted pulse number "$10^9+12$" of the oscillator 21a for 100 seconds and a product "$10^9$" that is obtained by multiplying the target oscillating frequency $N_1=10^7$ by 100 seconds, is added to the product "$10^9$" once in 100 seconds. Namely, as the frequency is higher by 0.12 Hz, the internal clock runs fast unless the correction is applied thereto, and therefore, the internal clock is set back by additionally counting 12 counts. On the contrary, when the actual oscillating frequency of the oscillator 21a is lower than the target oscillating frequency, the internal clock runs slow unless the correction is applied thereto, and therefore, the internal clock is set forward by reducing the number of counts. Thus, the time correcting means 21b corrects the time of the internal clock 21 according to the actual pulse number of the oscillator 21a, that is "$10^9+12$", once in 100 seconds.

Incidentally, as shown in FIG. 3, the time correcting means 21b resets the counts of $C_1$ and $C_2$ and starts the counts again from one, every time the OR gate circuit 32 generates the pulse (every second), in order to prevent the deviation between the counts of $C_1$ and $C_2$ and accumulation of the deviation. Further, $C_3$ is also reset and allowed to start the count again from one after it makes 100 counts to output "H" and the pulse is generated from the OR gate circuit 32.

Figure 4:
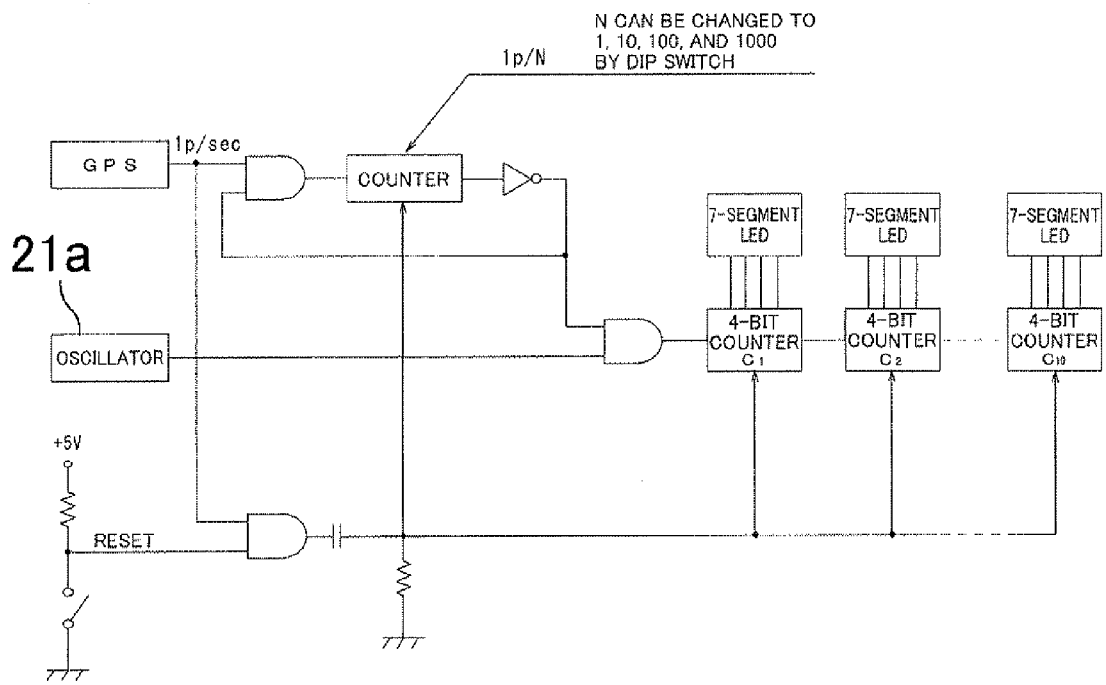
FIG. 4 is a circuit diagram showing an example of a pulse counter for counting output pulses of an oscillator of an internal clock that is contained in the measuring device of the multipoint simultaneous measurement system shown in FIG. 1.

Here, $N_1$ is a value that is fixed at $10^7$, but $N_2$ is a value that changes from one oscillator $21a$ to another, and can be determined in advance by using the GPS. Namely, $N_2$ can be determined by using the 1 p/sec signal of the GPS as a gate signal and counting the output pulses of the oscillator $21a$ per 100 seconds. An example of a circuit structure of a pulse counter of the oscillator $21a$ is shown in FIG. 4. As shown in FIG. 4, the value of $N_2$ of the oscillator $21a$ ($10^7+12$ in this example) can be determined by the lowest two digits of a numeral value displayed on 7-segment LEDs. The circuit in FIG. 4 uses the 1 p/sec pulse of the GPS as the gate signal, counts the output pulses of the oscillator $21a$ for 100 seconds, and stops. At this time, $N_2$ is determined by the lowest two digits of the value displayed on the 7-segment LEDs. Namely, when the actual oscillating frequency is 10,000,000.12 Hz, the display is made as 1,000,000,012, and N2 can be determined as $10^7+12$. As to the time interval for the time correction, the time when the values after the decimal point of the oscillating frequency are rounded to become the integer should be selected. In order to allow the two digits after the decimal point of the oscillating frequency to become the integer, multiples of 100, such as 100 seconds, 200 seconds, 300 seconds and the like, should be selected. It is preferable that the time correction is made once every 100 seconds to 300 seconds in order to reduce the time error during a period from the correction to the next correction.

Incidentally, the frequency stability of the above-described oscillator "OCXO8663 (manufactured by Oscilloquartz SA)" is $10^{-9}$ and the value of and from the third decimal place of the oscillating frequency become unstable, and therefore, the correction to the second decimal place is best suited. Meanwhile, a rubidium oscillator has the frequency stability of $10^{-10}$ to $10^{-11}$, and hence, correction effects to the third or fourth decimal place can be expected. In this case, when the correction is applied to the third decimal place, the time correction should be made at intervals of 1000 seconds. Table 2 summarizes the pulse numbers after the lapse of predetermined times and the time errors without the correction and with the correction at intervals of 10 seconds, 100 seconds and 1000 seconds, when the actual oscillating frequency of the oscillator $21a$ is 10,000,000.1234 Hz, for example. Further, changes in the time error relative to the elapsed time at this time are shown in FIG. 5.

Figure 5:
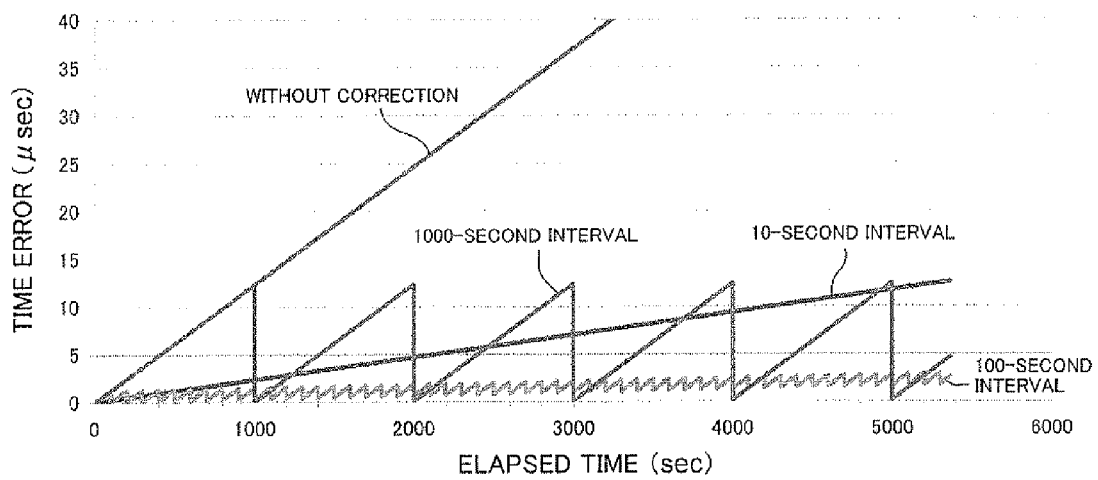
FIG. 5 is a graph showing changes in a time error relative to an elapsed time when correction is applied by the time correcting means of the measuring device of the multipoint simultaneous measurement system shown in FIG. 1 at intervals of 10 seconds, 100 seconds and 1000 seconds, and when the correction is not applied.

As shown in Table 2 and FIG. 5, when the correction is made at intervals of 10 seconds, the time error is reduced as compared with the case without the correction. However, it can be understood that the time error is accumulated as the time elapses. When the correction is made at intervals of 100 seconds, the time error is accumulated slightly as the time elapses. However, it can be understood that the accumulation of the error is extremely small as compared with the case where the correction is made at intervals of 10 seconds. Incidentally, the correction at intervals of 100 seconds shows the change in the time error by the time correcting means $21b$ shown in FIG. 3. It can also be understood that, when the correction is made at intervals of 1000 seconds, the time error immediately after the correction is reduced to be smaller than the case where the correction is made at intervals of 100 seconds, but the time error is increased greatly during a period from 100 to 200 seconds after the correction to immediately before the correction.

[Time Correction Mechanism in Three Stage Correction]

For this reason, in order to apply the correction to the third decimal place, it is necessary not only to make the time correction at intervals of 1000 seconds, but also to reduce the time error during the period from when the predetermined period has elapsed after the correction is made at intervals of 1000 seconds to immediately before the correction. Therefore, it is preferable to make the time correction at intervals of 100 seconds and/or 10 seconds during the 1000 seconds. An example of a circuit that makes the correction at intervals of 10 seconds, 100 seconds and 1000 seconds is shown in FIG. 6.

Figure 6:
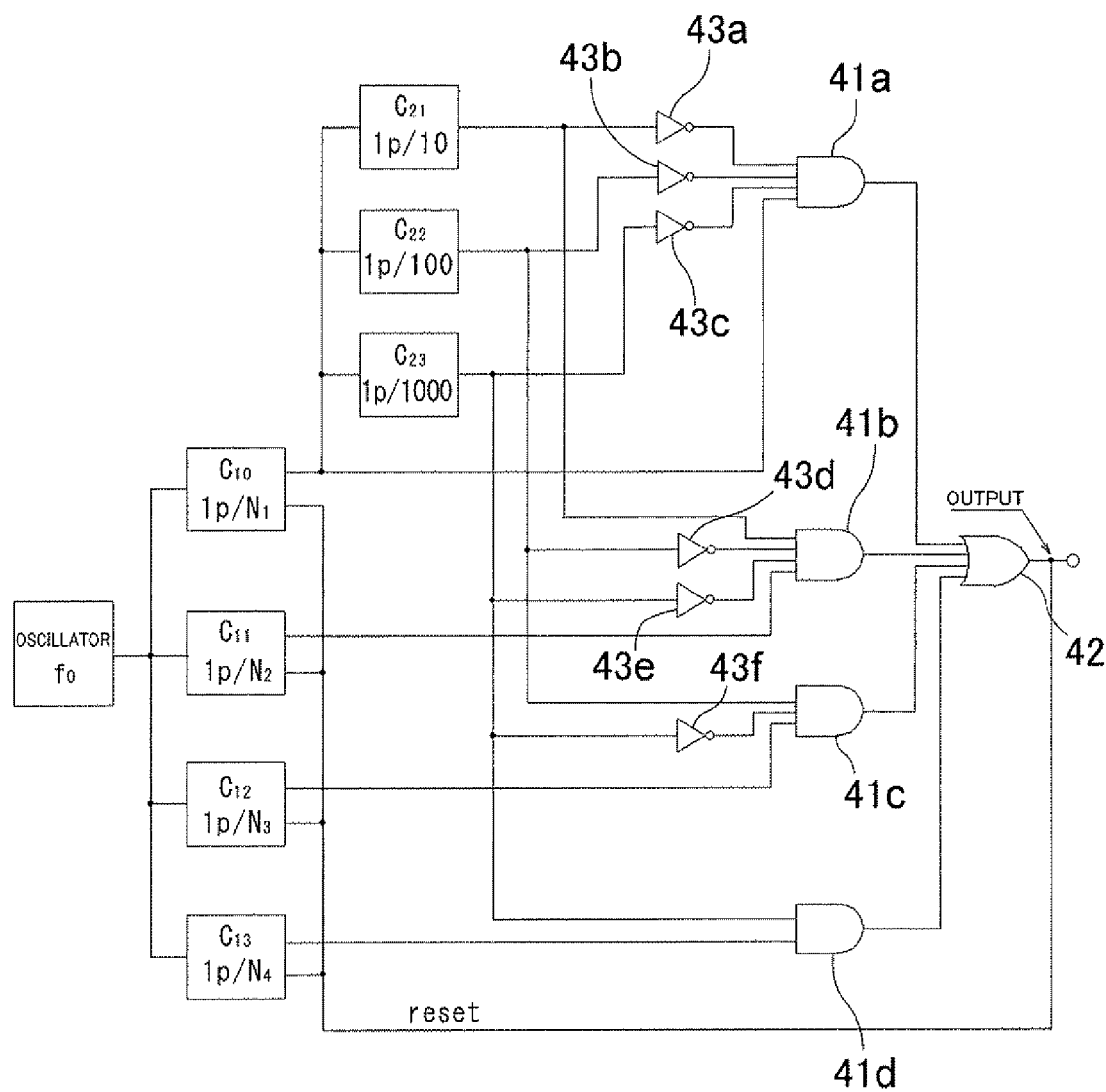
FIG. 6 is a circuit diagram of the time correcting means of the multipoint simultaneous measurement system shown in FIG. 1 that applies the correction in three stages.

It is supposed that the actual oscillating frequency of an oscillator $f_0$ in FIG. 6 is 10,000,000.1234 Hz. $C_{10}$, $C_{11}$, $C_{12}$, $C_{13}$, $C_{21}$, $C_{22}$ and $C_{23}$ are pulse counters, $N_1$ is $10^7$ as a pulse number corresponding to the target oscillating frequency (10 MHz), $N_2$ is set as $10^7+1$, $N_3$ is set as $10^7+2+1$, and $N_4$ is set as $10^7+3+2+1$. Namely, supposing that the actual oscillating frequency of the oscillator is 10,000,000.1234 Hz, the internal clock gains one pulse per 10 seconds (0.1 μsec), as shown in Table 2 (refer to "counter output value" and "without correction"). Therefore, the correction can be made in such a manner that $10^7$ pulses are made in one second for nine times out of 10 seconds, and for the remaining one time, $10^7+1$ (=$N_2$) counts are made in one second, so as to make $10^7 \times 9 + 10^7 + 1 = 10^8 + 1$ counts. In other words, when $10^7+1$ counts are made in one second, it means that the internal clock is set back by one pulse per 10 seconds (0.1 μsec).

Similarly, as shown in Table 2 (refer to "counter output value" and "without correction"), the internal clock gains 12 pulses per 100 seconds (1.2 μsec). As it is corrected to set back by one pulse per 10 seconds, however, it gains 12−(1×10)=2 pulses per 100 seconds in actuality. Therefore, the two pulses should be set back only once in 100 seconds. As this 100-second interval correction coincides with the 10th 10-second interval correction, it is necessary to set back 2+1=3 pulses in actuality. Therefore, the correction can be made in such a manner that $10^7$ pulses are made in one second for 90 times out of 100 seconds, $10^7+1$ pulses are made in one second for nine times according to the 10-second interval correction, and for the remaining one time, $10^7+2+1$ (=$N_3$) counts are made in one second, so as to make

TABLE 2

| Elapsed time (sec.) | Pulse number | | Error (μsec) | | | |
|---|---|---|---|---|---|---|
| | Theoretical value | Counter output value | Without correction | 10 | 100 | 1000 |
| 1 | 10,000,000.1234 | 10,000,000 | 0.01234 | 0.01234 | 0.01234 | 0.01234 |
| 10 | 100,000,001.234 | 100,000,001 | 0.12340 | 0.02340 | 0.12340 | 0.12340 |
| 100 | 1,000,000,012.340 | 1,000,000,012 | 1.23400 | 0.23400 | 0.03400 | 1.23400 |
| 1,000 | 10,000,000,123.400 | 10,000,000,123 | 12.34000 | 2.34000 | 0.34000 | 0.04000 |
| 3,600 | 36,000,000,444.240 | 36,000,000,444 | 44.42400 | 8.42400 | 1.22400 | 7.52400 |
| 10,000 | 100,000,001,234.000 | 100,000,001,234 | 123.40000 | 23.40000 | 3.40000 | 0.40000 |

$10^7 \times 90 + (10^7+1) \times 9 + 10^7 + 3 = 10^9 + 12$ counts. In other words, when $10^7+3$ counts are made in one second, it means that the internal clock is set back by three pulses per 100 seconds (0.3 μsec). Incidentally, the three pulses are made by adding two pulses corresponding to the second decimal place of the actual oscillating frequency and one pulse of the 10th 10-second interval correction.

Similarly, as shown in Table 2 (refer to "counter output value" and "without correction"), the internal clock gains 123 pulses per 1000 seconds (12.3 μsec). As it is corrected to set back by one pulse per 10 seconds and three pulses per 100 seconds, however, it gains $123-(1 \times 90+3 \times 10)=3$ pulses per 100 seconds in actuality. Therefore, the three pulses should be set back only once in 1000 seconds. As this 1000-second interval correction coincides with the 100th 10-second interval correction and the 10th 100-second interval correction, it is necessary to set back $3+2+1=6$ pulses in actuality. Therefore, the correction can be made in such a manner that $10^7$ pulses are made in one second for 900 times out of 1000 seconds, $10^7+1$ pulses are made in one second for 90 times according to the 10-second interval correction, $10^7+2+1$ pulses are made in one second for nine times according to the 100-second interval correction, and for the remaining one time, $10^7+3+2+1$ ($=N_4$) counts are made in one second, so as to make $10^7 \times 900 + (10^7+1) \times 90 + (10^7+3) \times 9 + 10^7 + 6 = 10^{10} + 123$ counts. In other words, when $10^7+6$ counts are made in one second, it means that the internal clock is set back by six pulses per 1000 seconds (0.6 μsec). Incidentally, the six pulses are made by adding three pulses corresponding to the third decimal place of the actual oscillating frequency, two pulses of the 10th 100-second interval correction, and one pulse of the 100th 10-second interval correction.

In the circuit shown in FIG. 6, $C_{10}$, $C_{11}$, $C_{21}$, AND circuits 41*a* and 41*b*, an OR circuit 42 and a NOT circuit 43*a* form a 10-second interval correction circuit. Further, $C_{10}$, $C_{12}$, $C_{22}$, the AND circuit 41*a*, an AND circuit 41*c*, the OR circuit 42 and a NOT circuit 43*b* form a 100-second interval correction circuit. Furthermore, $C_{10}$, $C_{13}$, $C_{23}$, the AND circuit 41*a*, an AND circuit 41*d*, the OR circuit 42 and a NOT circuit 43*c* form a 1000-second interval correction circuit. Each of the 10-second interval correction circuit, the 100-second interval correction circuit and the 1000-second interval correction circuit has the circuit structure similar to the circuit shown in FIG. 3, and operates similarly to the circuit shown in FIG. 3. Incidentally, NOT circuits 43*d* to 43*f* are provided to prevent simultaneous operation of at least two of the 10-second interval correction circuit, the 100-second interval correction circuit and the 1000-second interval correction circuit. An output of each of the AND circuits 41*a* to 41*d* becomes "H" only when both inputs are "H".

With the 10-second interval correction circuit, an output voltage of $C_{21}$ becomes "H (high level)" with a high voltage only when a pulse output of $C_{10}$ is counted for 10 times, and thereafter changes to "L (low level)" with a low voltage. When the output of $C_{21}$ is "L", an input to the AND circuit 41*a* becomes "H" by the NOT circuit 43*a*, and an input to the AND circuit 41*b* becomes "L". Thus, an output of the AND circuit 41*a* becomes "H", and the output of $C_{10}$ is inputted to the OR gate circuit 42. When the output of $C_{21}$ is "H", the input to the AND circuit 41*a* becomes "L" by the NOT circuit 43*a*, and the input to the AND circuit 41*b* becomes "H". Thus, an output of the AND circuit 41*b* becomes "H", and an output of $C_{11}$ is inputted to the OR gate circuit 42 via the AND circuit 41*b*. Namely, the pulses are generated by the output of $C_{10}$, that is, $N_1=10^7$ counts, at the first time to the ninth time, and the pulse is generated by the output of $C_{11}$, that is, $N_2=10^7+1$ counts, only at the 10th time.

The 100-second interval correction circuit and the 1000-second interval correction circuit operate similarly to the 10-second interval correction circuit. Namely, with the 100-second interval correction circuit, the pulses are generated by the output of $C_{10}$, that is, $N_1=10^7$ counts, at the first time to the 99th time, and the pulse is generated by an output of $C_{12}$, that is, $N_3=10^7+2+1$ counts, only at the 100th time. Further, with the 1000-second interval correction circuit, the pulses are generated by the output of $C_{10}$, that is, $N_1=10^7$ counts, at the first time to the 999th time, and the pulse is generated by an output of $C_{13}$, that is, $N_4=10^7+3+2+1$ counts, only at the 1000th time.

When an output of $C_{22}$ of the 100-second interval correction circuit is "L", the input to the AND circuit 41*b* becomes "H" by the NOT circuit 43*d*, and when an output of $C_{23}$ of the 1000-second interval correction circuit is "L", the input to the AND circuit 41*b* becomes "H" by the NOT circuit 43*e*, so that the operation of the AND circuit 41*b* is in accordance with the operation of the 10-second interval correction circuit. However, when the output of $C_{22}$ of the 100-second interval correction circuit is "H", or when the output of $C_{23}$ of the 1000-second interval correction circuit is "H", the input to the AND circuit 41*b* from the NOT circuit 43*d* or 43*e* becomes "L", so that the output of the AND circuit 41*b* becomes "L" at all times. Thereby, when the correction is made at intervals of 100 seconds and 1000 seconds, the 10-second interval correction cannot be made. Similarly, when the output of $C_{23}$ of the 1000-second interval correction circuit is "L", an input to the AND circuit 41*c* becomes "H" by the NOT circuit 43*f*, so that the operation of the AND circuit 41*c* is in accordance with the operation of the 100-second interval correction circuit. However, when the output of $C_{23}$ of the 1000-second interval correction circuit is "H", the input to the AND circuit 41*c* from the NOT circuit 43*f* becomes "L", so that an output of the AND circuit 41*e* becomes "L" at all times. Thereby, when the correction is made at intervals of 1000 seconds, the 100-second interval correction cannot be made. Therefore, the circuit shown in FIG. 6 is configured to make the correction according to the 1000-second interval correction (six pulses) by adding the correction amount by the 10-second interval correction (one pulse) and the correction amount by the 100-second interval correction (two pulses) to the correction amount by the 1000-second interval correction (three pulses), and to make the correction according to the 100-second interval correction (three pulses) by adding the correction amount by the 10-second interval correction (one pulse) to the correction amount by the 100-second interval correction (two pulses).

Thus, the circuit shown in FIG. 6 corrects the time of the internal clock at intervals of 10 seconds, 100 seconds and 1000 seconds. Incidentally, as shown in FIG. 6, the counts of $C_{10}$, $C_{11}$, $C_{12}$ and $C_{13}$ are reset and started again from one every time the OR gate circuit 42 generates a pulse (every second), in order to prevent the deviation between the counts of $C_{10}$, $C_{11}$, $C_{12}$ and $C_{13}$ and accumulation of the deviation. Further, the counts of $C_{21}$, $C_{22}$ and $C_{23}$ are also reset and started again from one after these outputs become "H" and the pulse is generated from the OR gate circuit 42.

FIG. 7 show changes in the time error relative to the elapsed time when the circuit shown in FIG. 6 makes the correction in three stages, that is, at intervals of 10 seconds, 100 seconds and 1000 seconds. As shown in FIG. 7, when the correction is made in three stages, the time error after the lapse of 5000 seconds is about 0.8 μsec at the maximum. It can be clearly understood that the time error is significantly reduced as compared with the respective results of the correction at intervals of 10 seconds, 100 seconds and 1000 seconds as shown in FIG. 5. When the correction is made in three stages like this, it is possible to make the correction to the third decimal place by using the rubidium oscillator having the excellent frequency stability, and to obtain the clock having extremely high time accuracy.

[Embodiment of Multipoint Simultaneous Measurement Method by Multipoint Simultaneous Measurement System]

According to the multipoint simultaneous measurement method of this embodiment of the present invention, the VCT combination test and the voltage matching test can be preferably carried out in the power station and the substation by the multipoint simultaneous measurement system 10. According to the multipoint simultaneous measurement method of this embodiment of the present invention, the measurement is performed by arranging the measuring devices 12 of the multipoint simultaneous measurement system 10 at a reference side measurement point A and a comparison side measurement point B, respectively, and arranging the master unit 11 at any place where it can wirelessly communicate with the measuring devices 12. When the wireless LAN is used as communication means, a wireless LAN access point may be provided between the master unit 11 and the measuring devices 12. It should be noted that, according to the following embodiment, the internal clock 21 is corrected at intervals of 100 seconds by using the time correcting means 21b shown in FIG. 3.

According to the multipoint simultaneous measurement method of this embodiment of the present invention, as shown in FIG. 8, the master unit 11 and the measuring devices 12 are turned on as a preparatory stage (step 1). When the wireless LAN access point is provided, the access point is also turned on and its connection is confirmed (steps 2 and 3). The measuring devices 12 are moved to the place where the devices can receive the GPS radio waves, and connected to the GPS receiver, and the internal clocks 21 are synchronized by setting the time of the internal clocks 21 by the GPS (step 4). Incidentally, the internal clocks 21 may be synchronized by bringing the measuring devices 12 closer and connecting them to each other via the dedicated cable. Thereby, the time of the internal clock 21 is kept being corrected by the time correcting means 21b at intervals of a fixed period of time (preferably at intervals of 100 seconds) until the power is turned off. The wireless connection between the measuring devices 12 and the master unit 11 by the wireless LAN or the PHS is confirmed (step 5).

Next, as a measurement stage, the measuring devices 12 are respectively moved to the reference side measurement point A and the comparison side measurement point B, and each measuring means 22 is connected to the signal lines of R, S, T and N to be able to measure the voltage and the current (step 6). A measurement button of the master unit 11 is pressed to start the measurement (step 7). The master unit 11 sets the time three minutes after pressing the measurement button as the measurement time (step 8), and transmits the measurement time to the measuring devices 12 (step 9). When receiving the measurement time from the master unit 11, each of the measuring devices 12 sets a measurement range (step 10) and, when the internal clock 21 reaches the measurement time, measures the current and the voltage by the measuring means 22 (step 11), and transmits the measurement data to the master unit 11 (step 12).

When receiving the measurement data from the measuring devices 12, the master unit 11 displays the measurement data (step 13), checks and stores the measurement data (step 14). When the measurement is finished, the measuring devices 12 are moved to the next measurement points, and the steps 6 to 14 are repeated. When the measurement at all the measurement points is finished, the master unit 11 and the measuring devices 12 are turned off, to finish the entire operation (step 15). Thus, the multipoint simultaneous measurement method according to the embodiment of the present invention can carry out the VCT combination test and the voltage matching test by using the multipoint simultaneous measurement system 10.

According to the multipoint simultaneous measurement method and the multipoint simultaneous measurement system 10 of this embodiment of the present invention, the time of the internal clock 21 is corrected by the time correcting means 21b at intervals of a fixed period of time (preferably at intervals of 100 seconds) during the measurement, which makes it possible to maintain the internal clock 21 with high accuracy. As the multipoint simultaneous measurement method and the multipoint simultaneous measurement system 10 of this embodiment of the present invention use the highly accurate oscillator 21a as the internal clock 21, the time of the internal clock 21 is hardly deviated from the correct time during a short period of time such as about one second, even though the correction is not made by the time correcting means 21b. However, the deviation between the time of the internal clock 21 and the correct time increases for a relatively long period of time such as about 100 seconds, and a significant difference is caused between the pulse number of the oscillator 21a that is actually counted in 100 seconds and the product that is obtained by multiplying the oscillating frequency 10 MHz of the oscillator 21a by 100 seconds. According to the multipoint simultaneous measurement method and the multipoint simultaneous measurement system 10 of this embodiment of the present invention, the generated difference is added to the product that is obtained by multiplying the oscillating frequency 10 MHz of the oscillator 21a by 100 seconds, once in 100 seconds, so as to eliminate the deviation from the correct time, and to correct the time of the internal clock 21.

According to the multipoint simultaneous measurement method and the multipoint simultaneous measurement system 10 of this embodiment of the present invention, the internal clock 21 contained inside each of the measuring devices 12 is maintained with high accuracy. Therefore, the measurement can be performed at the correct time even when the measuring device 12 is at the place where the GPS radio waves cannot be received. Further, the measuring device 12 is moved to the place where the GPS radio waves can be received to set the time of the internal clock 21, and then moved to the measurement point where the GPS radio waves cannot be received, so that the measurement can be performed while keeping the time information with higher accuracy. Incidentally, as the measuring device 12 can perform the measurement at the correct time even when it is at the place where the GPS radio waves cannot be received, it may be used as an independent measuring device.

According to the multipoint simultaneous measurement method and the multipoint simultaneous measurement system 10 of this embodiment of the present invention, the voltage and the current are measured by the measuring means 22 of each of the measuring devices 12 when the internal clock 21 that is maintained highly accurately reaches the specified time, so that the simultaneity can be secured with high accuracy. Even though the measuring devices 12 are not connected via the cable and the like, the measuring devices 12 perform the measurement based on the time of the internal clock 21, so that the measurement can be made with ease even when the measurement points are separated from each other. Thus, according to the multipoint simultaneous measurement method and the multipoint simultaneous measurement system 10 of this embodiment of the present invention, the simultaneity can be secured with high accuracy and with ease without connecting the cable and the like. Further, according to the multipoint simultaneous measurement method and the multipoint simultaneous measurement system 10 of this embodiment of the present invention, the measurement data is transmitted to and stored in the master unit 11, so that the measurement data can be controlled intensively by the master unit 11.

[Check Test of Phase Error Caused by Internal Clock]

Figure 9:
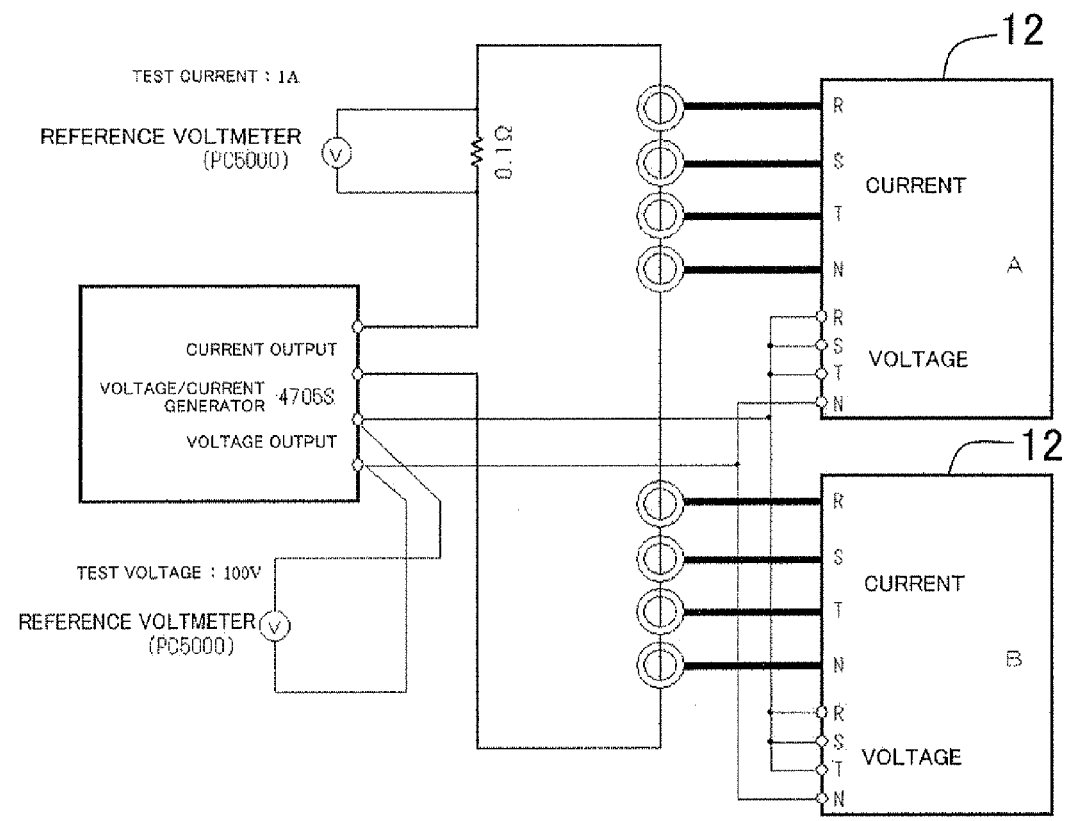
FIG. 9 is a circuit diagram showing a circuit for measuring a phase error of the measuring devices of the multipoint simultaneous measurement system shown in FIG. 1.

A phase error measurement circuit shown in FIG. 9 was used to measure a phase error caused by the internal clocks 21 of the measuring devices 12. As the voltage and the current are in phase in the circuit shown in FIG. 9, it is required that all the phases of the voltages (except for line voltages) and the currents measured by the measuring devices 12 are equal to each other. Namely, when a phase difference is shifted from 0 degree, it means there is an error.

The test was performed by the following procedures. First, the measuring devices 12 and the master unit 11 are turned on and, after the lapse of 30 minutes after turning on the power, the measuring devices 12 are taken outside where the GPS radio waves can be received, and synchronized by setting the time of the internal clocks 21. It should be noted that the internal clocks 21 are calibrated to be in a range of ±1 μsec relative to the Japan Standard Time. After the synchronization, the time of the internal clock 21 is kept being corrected by the time correcting means 21b at intervals of a fixed period of time (at intervals of 100 seconds). Next, the test circuit shown in FIG. 9 is formed. The measurement time that is set to be 10 minutes after the synchronization is transmitted from the master unit 11 to the measuring devices 12, and the measurement is performed in the measuring devices 12. The measurement data measured in the measuring devices 12 is transmitted to and stored in the master unit 11. Similarly, the measurement is performed by changing the measurement time to 20 minutes, 30 minutes, 1 hour, 1.5 hours, 2 hours, 2.5 hours, 3.5 hours, 4.5 hours and 5.5 hours after the synchronization. Incidentally, a test current is 1 A, and a test voltage is 100 V.

Figure 10:
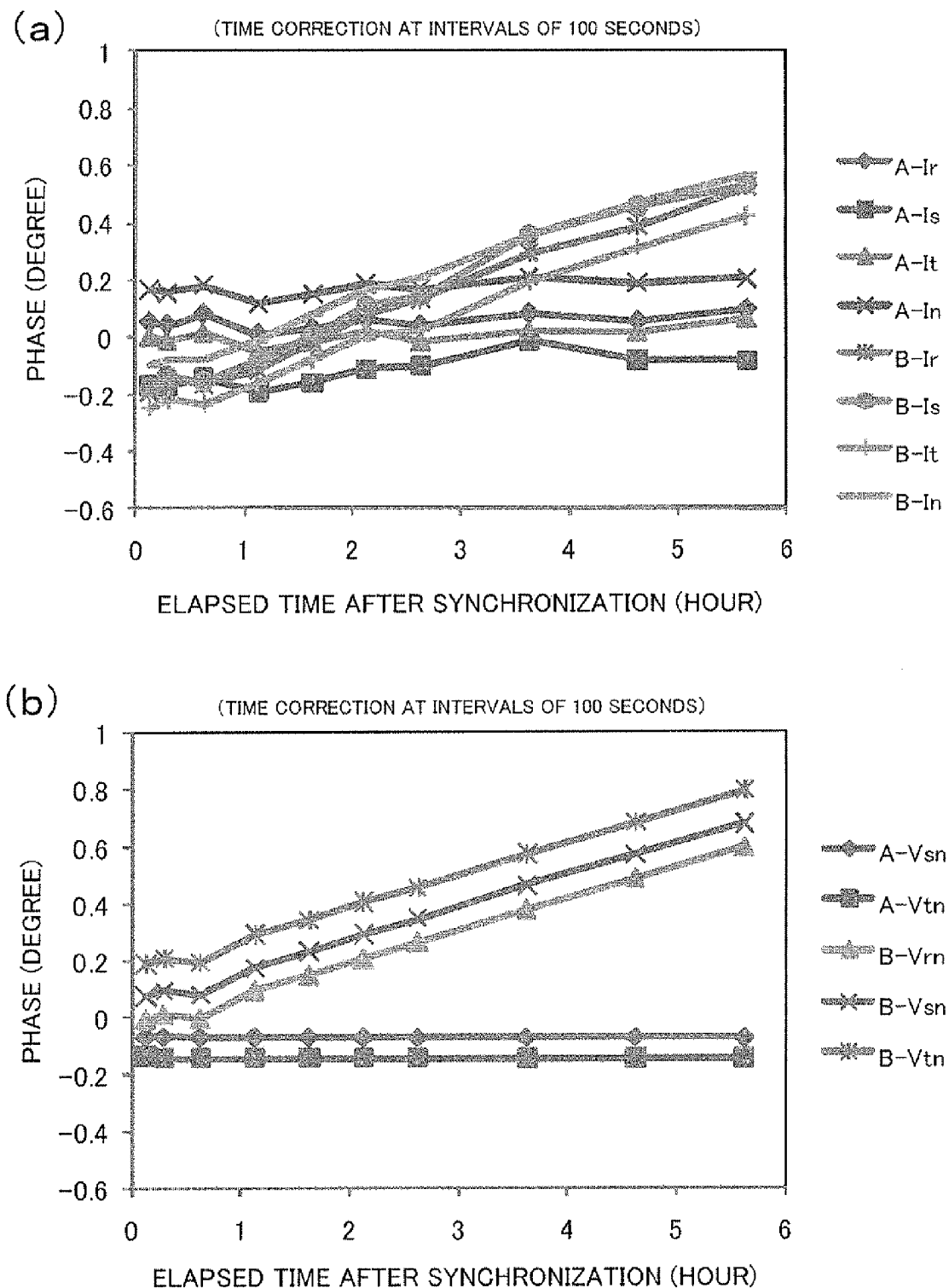
FIG. 10($a$) is a graph showing changes in current phases and FIG. 10($b$) is a graph showing changes in voltage phases, in a phase error measurement circuit of the measuring devices shown in FIG. 9, when synchronization is made by using a GPS.

Changes in the current phases are shown in FIG. 10(a) and changes in the voltage phases are shown in FIG. 10(b), out of the measurement results. The average of the phases for each measuring device is shown in FIG. 11(a) and FIG. 11(b) in order to make the difference between the measuring devices 12 easy to understand. Incidentally, one of the measuring devices is shown as "A", and the other is shown as "B" in FIG. 10 and FIG. 11. Further, in FIG. 10 and FIG. 11, Vm of the measuring device "A" is regarded as a phase reference.

As shown in FIG. 10 and FIG. 11, it can be confirmed that, for both of the current and the voltage, the phases of the measuring device "B" change to a plus side relative to the phases of the measuring device "A" as the reference, as the time elapses from the synchronization. An offset (a shift of the phase from 0 degree when the elapsed time is 0) is removed to obtain the phase error due to the internal clocks 21. When the offset is removed, the phase difference between the measuring devices "A" and "B" increases as the time elapses, and the phase difference becomes approximately 0.7° after the lapse of five hours. In this case, the phase difference per hour becomes 0.14°, which is about 8 μsec per hour when converted to a time error. Thus, according to the multipoint simultaneous measurement method and the multipoint simultaneous measurement system 10 of this embodiment of the present invention, the time error per hour between the internal clocks 21 of the measuring devices is equal to or lower than 10 μsec, and the synchronism is secured with extremely high accuracy.

Incidentally, the states of the phase changes in the voltage and the current seem to be different, as shown in FIG. 10 and FIG. 11. However, the assumption can be made that this may be due to sensor characteristics and variations in adjustment of clamp sensors that are used for measuring the current.

Next, the check test of the phase error was similarly performed by connecting the dedicated cable to the connectors for connection and synchronization 24 of the measuring devices 12, and connecting and synchronizing the measuring devices 12 with each other. The test was performed by the following procedures. First, the measuring devices 12 and the master unit 11 are turned on and, after the lapse of 30 minutes after turning on the power, the measuring devices 12 are connected to each other via the dedicated cable for synchronization of the internal clocks 21. After the synchronization, the time of the internal clock 21 is kept being corrected by the time correcting means 21b at intervals of the fixed period of time (at intervals of 100 seconds). The dedicated cable is disconnected from the measuring devices 12, and the test circuit shown in FIG. 9 is formed. The measurement time that is set to be 10 minutes after the synchronization is transmitted from the master unit 11 to the measuring devices 12, and the measurement is performed in the measuring devices 12. The measurement data measured in the measuring devices 12 is transmitted to and stored in the master unit 11. Similarly, the measurement is performed by changing the measurement time to 20 minutes, 30 minutes, 1 hour, 1.5 hours, 2 hours, 2.5 hours, 3.5 hours, 4.5 hours and 5.5 hours after the synchronization. Incidentally, the test current is 1 A, and the test voltage is 100 V.

Figure 12:
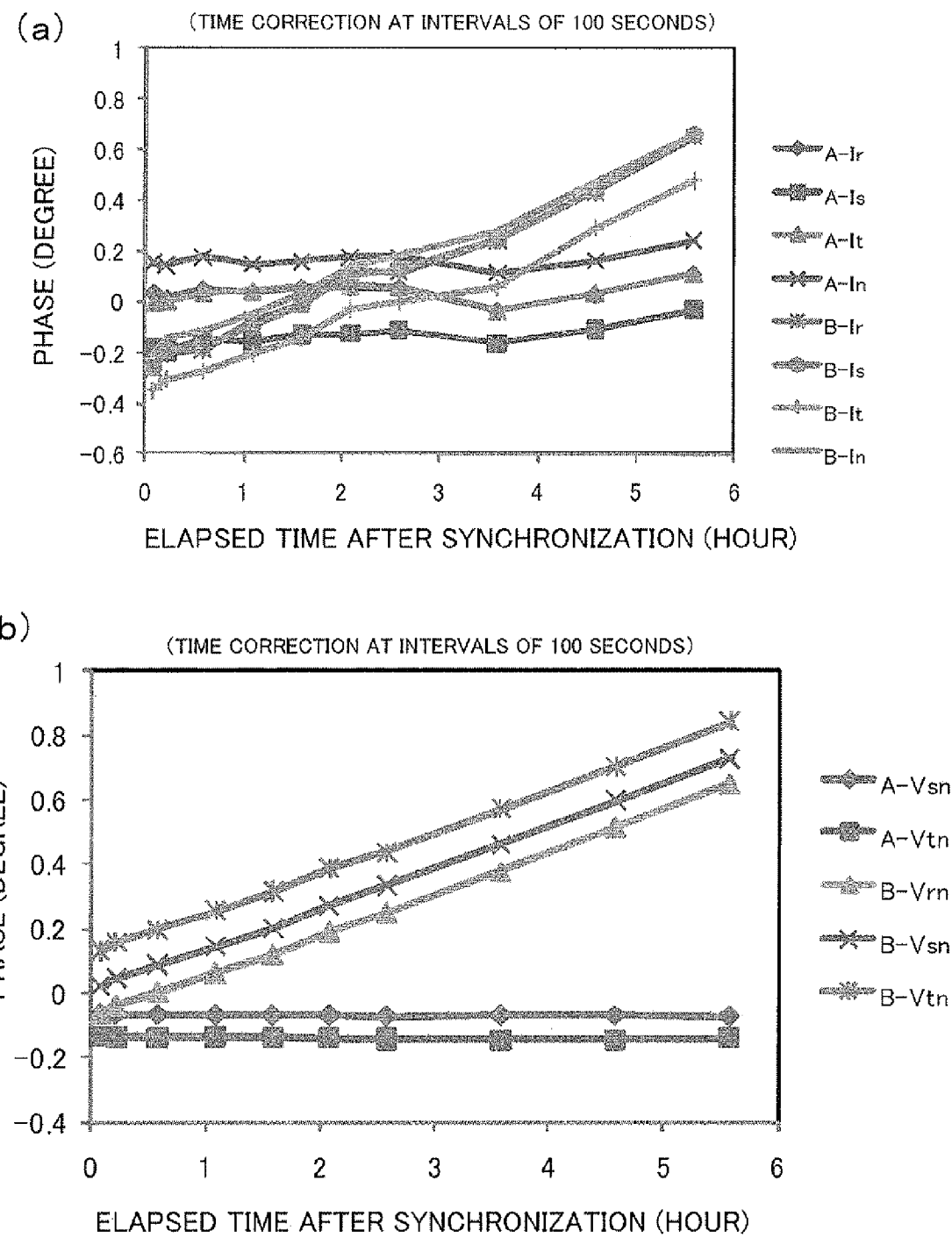
FIG. 12($a$) is a graph showing the changes in the current phases and FIG. 12($b$) is a graph showing the changes in the voltage phases, in the phase error measurement circuit of the measuring devices shown in FIG. 9, when synchronization is made by connecting the measuring devices via a dedicated cable.
Figure 13:
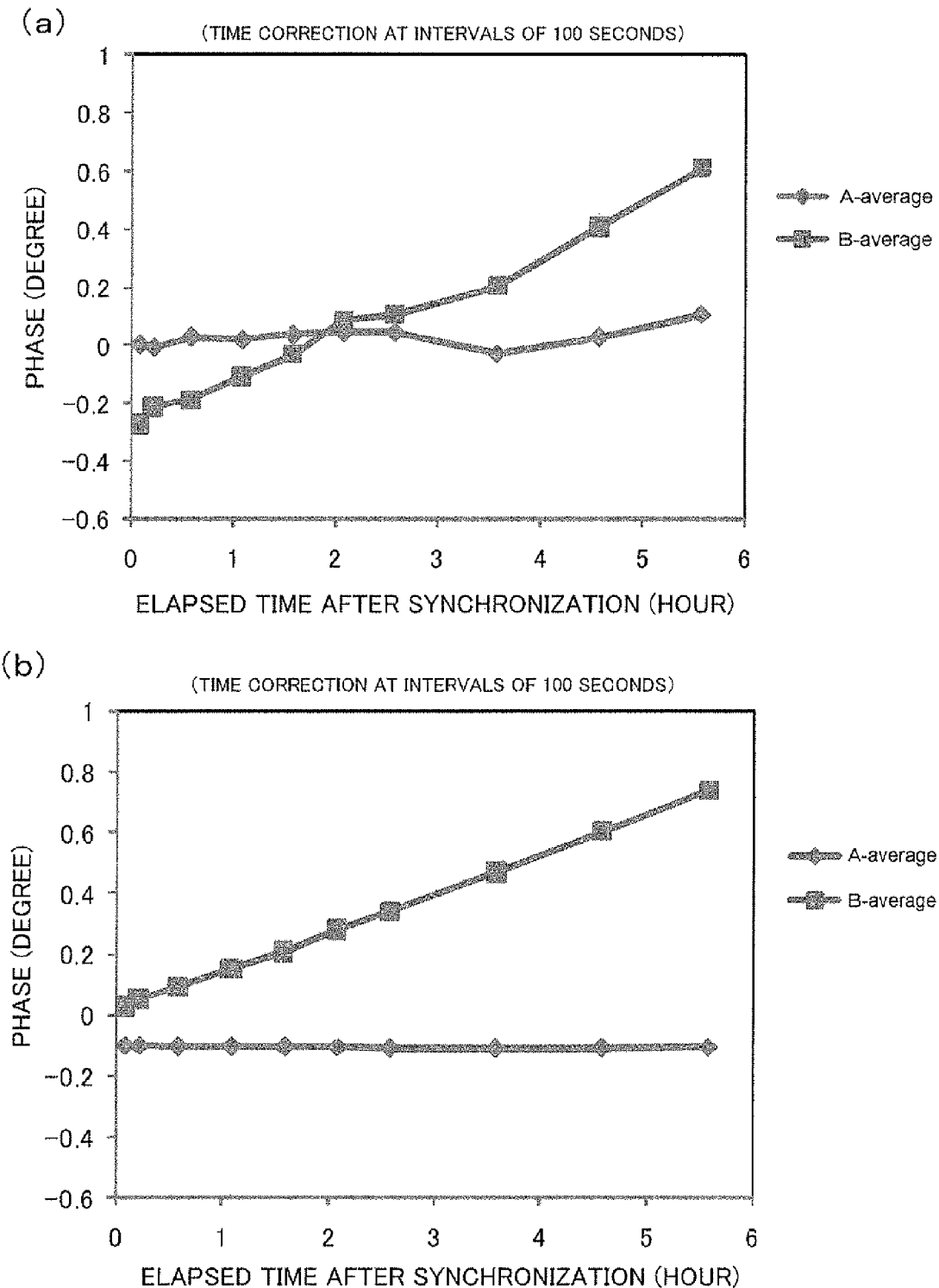
FIG. 13($a$) is a graph showing the average of the phases for each measuring device with regard to the changes in the current phases shown in FIG. 12($a$), and FIG. 13($b$) is a graph showing the average of the phases for each measuring device with regard to the changes in the voltage phases shown in FIG. 12($b$).

The changes in the current phases are shown in FIG. 12(a) and the changes in the voltage phases are shown in FIG. 12(b), out of the measurement results. The average of the phases for each measuring device is shown in FIG. 13(a) and FIG. 13(b) in order to make the difference between the measuring devices 12 easy to understand. Incidentally, one of the measuring devices is shown as "A", and the other is shown as "B" in FIG. 12 and FIG. 13, too. Further, Vrn of the measuring device "A" is regarded as the phase reference in FIG. 12 and FIG. 13, too.

As shown in FIG. 12 and FIG. 13, it can be confirmed that the phases of the measuring device "B" change to the plus side relative to the phases of the measuring device "A" as the reference, as the time elapses from the synchronization. When the offset is removed, the phase difference between the measuring devices "A" and "B" increases as the time elapses, and the phase difference becomes approximately 0.7° after the lapse of five hours. The change in the phase difference has the almost same tendency as the result of when the synchronization is made by using the GPS as shown in FIG. 10 and FIG. 11. Thus, according to the multipoint simultaneous measurement method and the multipoint simultaneous measurement system 10 of this embodiment of the present invention, it is possible to secure the synchronism with extremely high accuracy not only when the synchronization is made by using the GPS, but also when the synchronization is made by using the dedicated cable. According to the multipoint simultaneous measurement method and the multipoint simultaneous measurement system 10 of this embodiment of the present invention, the measuring devices 12 are brought closer and connected to each other via the dedicated cable for the synchronization, and then moved to the measurement points, so as to perform the measurement while securing the simultaneity with high accuracy.

REFERENCE SINGS LIST

10 Multipoint simultaneous measurement system
11 Master unit
12 Measuring device
21 Internal clock
21a Oscillator
21b Time correcting means
22 Measuring means
22a Current measuring unit
22b Voltage measuring unit
22c A/D converter
23 Transmitting/receiving means
24 Connector for connection and synchronization
25 Control unit
31a AND circuit
31b AND circuit
32 OR gate circuit
33 NOT circuit

The invention claimed is:

1. A multipoint simultaneous measurement method in an electric power station, comprising the steps of:
providing a plurality of measuring devices and a master unit configured to be able to wirelessly transmit/receive a signal to/from the measuring devices;
providing an internal clock that is operated by time correcting means having an oscillator contained therein and a counter for counting an output pulse from the oscillator in each of the measuring devices, the internal clock being configured to correct its time by adding a difference between a pulse number that is obtained by multiplying an actual oscillating frequency oscillated by the oscillator by a fixed period of time and a product that is obtained by multiplying a target oscillating frequency by the fixed period of time, to the pulse number at intervals of the fixed period of time, the fixed period of time being a time when the pulse number after a decimal point of the oscillating frequency of the oscillator is rounded to be an integer;
synchronizing the internal clocks of the measuring devices by GPS radio waves or by connecting the measuring devices;
correcting the internal clocks of the measuring devices continuously at intervals of the fixed period of time from when the internal clocks are synchronized until when measurement is finished;
arranging the measuring devices to respective measurement points;
transmitting a measurement time from the master unit to the measuring devices; and
measuring a predetermined physical quantity by the measuring devices when the internal clocks reach the measurement time transmitted from the master unit, and transmitting measurement data from the measuring devices to the master unit.

2. The multipoint simultaneous measurement method in the electric power station according to claim 1,
wherein, supposing that the target oscillating frequency is $10^N$ (N is a natural number) Hz, and an actually-counted oscillating frequency of the oscillator is $10^N + 0.1 \times a + 0.01 \times b$ Hz (a and b are one-digit integers), the internal clock is configured to correct the time once in 100 seconds in such a manner that $10^N$ counts are made in one second for 99 times out of 100 seconds, and $10^N + 10 \times a + b$ counts are made in one second for remaining one time.

3. The multipoint simultaneous measurement method in the electric power station according to claim 1,
wherein, supposing that the target oscillating frequency is $10^N$ (N is a natural number) Hz, and an actually-counted oscillating frequency of the oscillator is $10^N + 0.1 \times a + 0.01 \times b + 0.001 \times c$ Hz (a, b and c are one-digit integers), the internal clock is configured to correct the time at intervals of 10 seconds, 100 seconds, and 1000 seconds in such a manner that $10^N$ counts are made in one second for nine times out of 10 seconds, $10^N + a$ counts are made in one second according to 10-second interval correction for remaining one time, $10^N + a + b$ counts are made in one second according to 100-second interval correction for 10th 10-second interval correction, and $10^N + a + b + c$ counts are made in one second according to 1000-second interval correction for 10th 100-second interval correction.

4. An internal clock wherein its use is found in the multipoint simultaneous measurement method in the electric power station according to claim 1.

5. A multipoint simultaneous measurement system in an electric power station, comprising:
a plurality of measuring devices each having the internal clock according to claim 4, to measure a predetermined physical quantity when the internal clock reaches a specified time; and
a master unit configured to be able to wirelessly transmit/receive a signal to/from the measuring devices,
wherein the master unit is configured to be able to transmit a measurement time to the measuring devices and to receive the predetermined physical quantity measured by the measuring devices from the measuring devices, and
wherein each of the measuring devices is configured to measure the predetermined physical quantity when the internal clock reaches the measurement time transmitted from the master unit, and to transmit it to the master unit.

6. An internal clock wherein its use is found in the multipoint simultaneous measurement method in the electric power station according to claim 2.

7. An internal clock wherein its use is found in the multipoint simultaneous measurement method in the electric power station according to claim 3.

* * * * *